(12) United States Patent
Avakian

(10) Patent No.: US 7,968,657 B2
(45) Date of Patent: Jun. 28, 2011

(54) THERMOPLASTIC POLYHYDROXYALKANOATE COMPOUNDS

(75) Inventor: Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 85 days.

(21) Appl. No.: 12/446,016

(22) PCT Filed: Oct. 19, 2007

(86) PCT No.: PCT/US2007/081898
§ 371 (c)(1),
(2), (4) Date: Apr. 17, 2009

(87) PCT Pub. No.: WO2008/049099
PCT Pub. Date: Apr. 24, 2008

(65) Prior Publication Data
US 2010/0193744 A1    Aug. 5, 2010

Related U.S. Application Data

(60) Provisional application No. 60/862,446, filed on Oct. 21, 2006.

(51) Int. Cl.
| C08G 63/00 | (2006.01) |
| C12P 7/62 | (2006.01) |
| C12P 7/40 | (2006.01) |
| C08K 3/00 | (2006.01) |
| C08K 3/30 | (2006.01) |
| C08K 3/08 | (2006.01) |
| C08K 3/04 | (2006.01) |
| C04B 28/14 | (2006.01) |
| C04B 35/66 | (2006.01) |
| C09D 5/38 | (2006.01) |
| B60C 1/00 | (2006.01) |
| C09K 3/00 | (2006.01) |
| H01B 1/00 | (2006.01) |

(52) U.S. Cl. ........ 525/437; 435/135; 435/136; 525/444; 524/423; 524/439; 524/440; 524/441; 524/495; 524/404; 524/428; 524/403; 252/478; 252/500

(58) Field of Classification Search ............... 525/437, 525/444
See application file for complete search history.

(56) References Cited

U.S. PATENT DOCUMENTS

| 5,281,669 | A | * | 1/1994 | Kambour et al. ............. 525/177 |
| 5,648,454 | A | * | 7/1997 | Brunelle ..................... 528/491 |
| 6,048,379 | A | * | 4/2000 | Bray et al. ................... 75/229 |
| 6,071,998 | A | | 6/2000 | Muller et al. |
| 7,098,292 | B2 | | 8/2006 | Zhao et al. |
| 7,135,540 | B2 | | 11/2006 | Honma et al. |
| 7,582,456 | B2 | | 9/2009 | Chen |
| 2001/0029039 | A1 | | 10/2001 | Honma et al. |
| 2002/0060445 | A1 | * | 5/2002 | Shirk et al. .................. 280/728.1 |
| 2003/0096384 | A1 | | 5/2003 | Kenmoku et al. |
| 2003/0100700 | A1 | | 5/2003 | Imamura et al. |
| 2004/0225269 | A1 | * | 11/2004 | Zhao et al. ................... 604/364 |
| 2005/0035125 | A1 | | 2/2005 | Bae |

OTHER PUBLICATIONS

Ha, C.-S., Cho, W.-J. Prog. Polym. Sci., vol. 27, p. 759-809, 2002.*
Avella, M., Martuscelli, E., Raimo, M. Journal of Material Science, vol. 35, p. 523-545, 2000.*
Braunegg, G., Lefebvre, G., Genser, K.F. Journal of Biotechnology, vol. 65, 127-161, 1998.*
Cyclics Corporation, "CBT 100 Thermoplastic Resin—Preliminary Data Sheet" (2004).

* cited by examiner

*Primary Examiner* — Vasu Jagannathan
*Assistant Examiner* — Anthony H Sheh
(74) *Attorney, Agent, or Firm* — John H. Hornickel

(57) ABSTRACT

A thermoplastic compound is disclosed, comprising polyhydroxyalkanoate and macrocyclic poly(alkylene dicarboxylate) oligomer. Optionally the compound also includes additional polymers and functional additives to modify physical properties of the compound. Molded or extruded plastic articles can be made from the compound. The compound is ductile, in comparison to the polyhydroxyalkanoate without the macrocyclic poly(alkylene dicarboxylate) oligomer.

20 Claims, No Drawings

THERMOPLASTIC POLYHYDROXYALKANOATE COMPOUNDS

CLAIM OF PRIORITY

This application claims priority from U.S. Provisional Patent Application Ser. No. 60/862,446 and filed on Oct. 21, 2006, which is incorporated by reference.

FIELD OF THE INVENTION

This invention concerns the mixture of polyhydroxyalkanoates with additives to improve ductility.

BACKGROUND OF THE INVENTION

People benefit from plastic articles. From their invention in the mid-20$^{th}$ Century until the present, thermoplastic polymers have become the composition of many consumer products. Such products are relatively lightweight, sturdy, and corrosion resistant.

Thermoplastic polymers during the past half-century have used resins produced from petrochemical feedstocks. As this Century progresses, there will be an increasing need to produce thermoplastic polymers from biomass feedstocks, whether because of geopolitical considerations, environmental considerations, or supply considerations. One of the thermoplastic polymers produced from bio-derived sources are polyhydroxyalkanoates.

According to European Patent Publication 1 705 250, polyhydroxyalkanoates (PHAs) are biological polyesters accumulated in cells by special microorganisms under special growth conditions and have the following general formula:

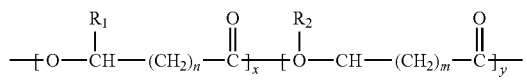

in which, n and m are integers from 1 to 4; $R_1$ and $R_2$ are straight chain or branched chain $C_{1-12}$ alkyl which are substituted or non-substituted; X and Y are not 0 simultaneously, and determine the content of the components in copolymer. The average molecular weight of PHAs is generally 1-4 million Da.

The physical property of PHAs is similar to that of polypropylene. But because its biodegradability, biocompatibility, piezoelectricity and optical activity are characteristics not possessed by common petrochemical resins, it has wide application prospect in industry, agriculture, medicine, sanitation, food, electronics, etc.

Unfortunately, PHAs are quite brittle without modification by additives.

SUMMARY OF THE INVENTION

What the art needs is a thermoplastic PHA compound that is ductile.

The present invention solves that problem of brittle PHA by modifying PHA with macrocyclic poly(alkylene dicarboxylate) oligomers. These oligomers, also known as MPOs, are well reported in the literature as having preferred thermoplastic manufacturing characteristics and preferred thermoset use characteristics. One manufacturer, Cyclics Corporation, reports on its CBT™ resin products at www.cyclics.com.

Thus, one aspect of the present invention is a thermoplastic polyhydroxyalkanoate compound, comprising polyhydroxyalkanoate mixed with macrocyclic poly(alkylene dicarboxylate) oligomer.

Another aspect of the present invention is a molded article made from the thermoplastic polyhydroxyalkanoate compound.

Another aspect of the present invention is an extruded article made from the thermoplastic polyhydroxyalkanoate compound.

EMBODIMENTS OF THE INVENTION

Polyhydroxyalkanoates

According to U.S. Pat. No. 6,071,998, several types of PHAs are known.

It is useful to broadly divide the PHAs into two groups according to the length of their side chains and according to their pathways for biosynthesis. Those with short side chains, such as polyhydroxybutyrate (PHB), a homopolymer of R-3-hydroxybutyric acid units, are crystalline thermoplastics. These polymers have been known for about seventy years (Lemoigne & Roukhelman 1925).

PHAs with long side chains are more elastomeric and a relatively recent discovery (deSmet, et al., J. Bacteriol., 154: 870-78 (1983)). Before this designation, however, PHAs of microbial origin containing both R-3-hydroxybutyric acid units and longer side chain units from $C_5$ to $C_{16}$ were identified (Wallen & Rowheder, Environ. Sci. Technol., 8:576-79 (1974)).

A number of bacteria which produce copolymers of D-3-hydroxybutyric acid and one or more long side chain hydroxyacid units containing from five to sixteen carbon atoms have been identified more recently (Steinbuchel & Wiese, Appl. Microbiol. Biotechnol., 37:691-97 (1992); Valentin et al., Appl. Microbiol. Biotechnol., 36:507-14 (1992); Valentin et al., Appl. Microbiol. Biotechnol., 40:710-16 (1994); Abe et al., Int. J. Biol Macromol., 16:115-19 (1994); Lee et al, Appl. Microbiol. Biotechnol., 42:901-09 (1995); Kato et al., Appl. Microbiol. Biotechnol., 45:363-70 (1996); Valentin et al., Appl. Microbiol. Biotechnol., 46:261-67 (1996); U.S. Pat. No. 4,876,331 to Doi).

Useful examples of specific two-component copolymers include PHB-co-3-hydroxyhexanoate (Brandi et al., Int. J. Biol. Macromol., 11:49-55 (1989); Amos & McInerey, Arch. Microbiol., 155:103-06 (1991); U.S. Pat. No. 5,292,860 to Shiotani et al.).

Chemical synthetic methods have also been applied to prepare racemic PHB copolymers of this type for applications testing (WO 95/20614, WO 95/20615, and WO 96/20621).

Suitable molecular weights of the polymers are between about 10,000 and 4 million Daltons. Preferable molecular weights are between about 50,000 and 1.5 million Daltons. The PHAs preferably contain one or more units of the following formula:

wherein n is 0 or an integer; and wherein $R^1$, $R^2$, $R^3$, and $R^4$ are independently selected from saturated and unsaturated hydrocarbon radicals, halo- and hydroxy-substituted radicals, hydroxy radicals, halogen radicals, nitrogen-substituted radicals, oxygen-substituted radicals, and hydrogen atoms.

Suitable monomeric units include hydroxybutyrate, hydroxyvalerate, hydroxyhexanoate, hydroxyheptanoate, hydroxyoctanoate, hydroxynonanoate, hydroxydecanoate, hydroxyundecanoate, and hydroxydodecanoate units. PHAs including monomers and polymers and derivatives of 3-hydroxyacids, 4-hydroxyacids and 5-hydroxyacids can be used. Representative PHAs are described in Steinbuchel & Valentin, FEMS Microbiol. Lett., 128:219-28 (1995).

A variety of PHAs, having a wide range of polymer physical properties, can be produced, depending on the hydroxyacid monomer composition used (Steinbuchel & Valentin, FEMS Microbiol. Lett., 128:219-28 (1995)). The range of properties include, for example, melting temperatures between about 40° C. and 180° C., glass transition temperatures between about −35° C. to 5° C., degrees of crystallinity between about 0% and 80%, and elongation to break between about 5 and 500%. The rate of crystallization can be controlled.

Polyhydroxybutyrate, for example, has characteristics similar to those of polypropylene, while polyhydroxyoctanoates (a copolymer of D-3-hydroxyoctanoate and D-3-hydroxyhexanoate) behave more as elastomers, and PHAs with longer side chains have characteristics similar to waxes. The range of PHA polymers available with melting temperatures ranging from 40 to 180° C. provides additional flexibility in shape formation.

PHAs can exist in at least two distinct physical forms, as amorphous granules or as crystalline solids. The tendency of the PHAs to crystallize in terms of both final degree of crystallinity and rates of crystallization also varies with composition. PHA polymers offering rapid crystallization can be used for high green strength. These would include, for example polyhydroxybutyrate (PHB) and polyhydroxybutyrate-co-valerate (PHBV), with the latter copolymer exhibiting the unique feature of isodimorphism. Where higher malleability is desired, polyhydroxyoctanoates (PHOs) and other longer pendant group types could be used. This polymer class has a lower glass transition temperature, around −35° C. as compared to 5° C. for the PHB homopolymer, allowing them to be formulated as self lubricating. This in turn reduces the need for other additives to obtain suitable flow characteristics for the mixture fed to the shaping system.

PHAs are thermally decomposable, a major advantage over thermoplastic polymers made from petrochemical feedstocks.

Suitable commercial PHA copolymers are selected from the group consisting of polyhydroxybutyrate-co-hydroxyvalerate, polyhydroxybutyrate-co-4-hydroxybutrate, polyhydroxybutyrate-co-3-hydroxyhexanoate, polyhydroxybutyrate-co-3-hydroxyheptanoate, and polyhydroxybutyrate-co-3-hydroxyoctanoate.

PHAs are further described in the following patents, which are incorporated by reference herein: U.S. Pat. Nos. 7,094,840; 7,081,357; 7,026,526; 6,913,911; 6,878,758; 6,867,248; 6,867,247; 6,838,493; 6,828,357; 6,780,911; 6,709,848; 6,689,589; 6,623,749; 6,620,869; 6,610,764; 6,593,116; 6,586,658; 6,576,450; 6,548,569; 6,323,276; 6,323,010; 6,316,262; 6,245,537; 6,228,934; 6,214,920; 6,207,217; 6,083,729; and 5,480,794. All of these patents are issued to Metabolix, which is one of the commercial producers of PHAs. Another commercial producer of PHAs is Tianan Biological Material of China.

Macrocyclic Poly(Alkylene Dicarboxylate) Oligomers

As mentioned above, these oligomers behave as thermoplastics during manufacturing but behave as thermosets during use. For purposes of the present invention, these oligomers added to PHAs contribute very needed ductility.

CBT™ Resins of cyclic poly(butylene terephthalate) ("PBT") are solid (powder, pellet, flake) at room temperature and when heated are fully molten above 150° C. (300° F.), with a viscosity in the range of 150 mPa (150 cP), and drops in viscosity to below 20 mPa (20 cP) at 180° C. (355° F.). When mixed with specific tin or titanium polymerization catalysts the PBT rings in cyclical form open and connect (i.e., polymerize) to form high molecular weight PBT thermoplastic without exotherm or off-gassing. Full polymerization can occur in tenth's of seconds or many minutes depending on the temperature and type of catalyst used. This initial water-like viscosity allows rapid and excellent wet-out of fillers and fiber reinforcements. Very high filler loadings of 80 volume percent or greater have been achieved. The combination of low viscosity and rapid polymerization allows for fast processing in many different applications.

These CBT™ Resins exhibit the following properties according to Cyclics Corporation: Commercially available PBT grades exhibit a wide range of mechanical, electrical and thermal properties when combined with typical polymer additives and fillers, making PBT thermoplastic a very versatile material. Some of these material advantages include stiffness and toughness, high heat resistance in reinforced grades, chemical resistance, dimensional stability/low water absorption, electrical insulation and high arc resistance, flame retardancy, thermoformability, adaptability to post-mold operations (e.g., welding, gluing, painting), and recycling.

Macrocyclic poly(alkylene dicarboxylate) oligomers are well identified and characterized in U.S. Pat. Nos. 6,436,549; 6,436,548; 6,420,048; 6,420,047; 6,369,157; 5,710,086; 5,668,186; 5,663,282; 5,661,214; 5,648,454; 5,591,800; 5,527,976; 5,498,651; 5,466,744; 5,446,122; 5,434,244; 5,407,984; 5,389,719; 5,387,666; 5,386,037; 5,348,985; 5,231,161; 5,191,013; and 5,039,783 and in U.S. Patent Publication 20020107356; the disclosures of all of which are incorporated herein by reference. Such patents also describe the method of manufacture.

Optional Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Of these optional additives, two are preferable. Impact modifiers such as olefinic or styrenic rubbers can be added to improve impact, and nucleating agents such as boron nitride can be added to assist the pace of crystallization of the compound during manufacture.

Optional Other Polymers

The compound of the present invention can include conventional polymers mixed into the compound to adjust morphology, rheology, or other properties of the thermoplastic matrix of the compound. These optional polymers can be added in an amount that is sufficient to obtain a desired processing or performance property for the compound. The amount should not be wasteful of the additive nor detrimental to the processing or performance of the compound.

Non-limiting examples of optional polymers include those made from petrochemicals and those made from bio-derived resins. Of the many choices possible, polycarbonate (PC), linear-low-density-polyethylene (LLDPE), (meth)acrylates such as methyl methacrylate (PMMA) and ethylene ethyl acrylate (EEA), and polylactic acid (PLA) all can adjust physical properties of the PHA in a desirable manner.

Table 1 shows acceptable, desirable, and preferable weight percentages of ingredients in the compounds of the present invention.

TABLE 1

Weight Percent of Ingredients

| Ingredient | Acceptable | Desirable | Preferable |
|---|---|---|---|
| PHA | 10-90 | 20-80 | 30-70 |
| MPO | 10-50 | 15-30 | 15-25 |
| Optional Additive | 0-30 | 0-20 | 0-20 |
| Optional Polymer | 0-60 | 0-40 | 0-20 |

Processing

The preparation of compounds of the present invention is uncomplicated. The compound of the present can be made in batch or continuous operations.

Mixing in a continuous process typically occurs in an extruder that is elevated to a temperature that is sufficient to melt the polymer matrix with addition either at the head of the extruder or downstream in the extruder of the solid ingredient additives of polyaniline-grafted lignosulfonic acid, nanometric carbonaceous material, and any optional additive. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives of polyaniline-grafted lignosulfonic acid, nanometric carbonaceous material, and any optional additive. The mixing speeds range from 60 to 1000 rpm and temperature of mixing can be ambient. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

Thermoplastic PHA compounds of the present invention, with the modification by MPOs, have superior ductility to PHA compounds without MPOs.

Insignificant human hand pressure between thumb and forefinger applied to unmodified PHBV extruded stands approximately 1-5 mm in diameter immediately breaks such strands. By direct comparison, modified PHBV strands can bend between thumb and forefinger without breaking, to angles of the ends being at least 90° relative to their original position. At the point of bending, the strand bends at least 180° without breaking.

Modified PHAs of the present invention can therefore become replacement polymers for any and all manner of thermoplastic compounds used to make extruded or molded plastic articles. The ductility of compounds of the present invention makes this usefulness possible.

Property modifications of PHA-MPO-based thermoplastic compounds can be found using additives to modify thermal conductivity, electrical conductivity, specific gravity, and sound dampening. With these additions, one can make quite sophisticated engineered thermoplastic compounds.

Non-limiting examples of thermal conductivity additives include pitch carbon, graphite, diamond, metal nitrides such as boron nitride and aluminum nitride, nanotubes of carbon and boron nitride, titanium diboride, cobalt, zinc, molybdenum, iridium, silicon, rhodium, magnesium, tungsten, beryllium, aluminum, gold, copper, silver, and combinations thereof.

Non-limiting examples of electrical conductivity additives include carbon black, silver, copper, stainless steel powder or fibers, graphite, zinc, aluminum, carbon nanotubes, manganese, bismuth, samarium, titanium, zirconium, lead, antimony, vanadium, chromium, tin, palladium, platinum, iron, nickel, zinc, cobalt, molybdenum, tungsten, iridium, indium, rhodium, magnesium, beryllium, aluminum, gold, silver, magnetite, bronze, brass, and combinations thereof.

Non-limiting examples of sound dampening additives include tungsten, barium sulfate, zirconium sulfate, calcium sulfate, lead, tungsten, gold, platinum, iridium, osmium, rhenium, tantalum, hafnium, palladium, rhodium, borite, magnetite, hematite, zirconia, ceramic beads, chromite, and combinations thereof.

Non-limiting examples of ionizing-radiation-opacity additives include tungsten, lead, zirconium, graphite, silicon, indium, aluminum, iridium, boron, cadmium, europium, samarium, and combinations thereof.

Non-limiting examples of ionizing-radiation-opacity additives include tungsten, lead, zirconium, graphite, silicon, indium, aluminum, iridium, boron, cadmium, europium, samarium, and combinations thereof.

The amount of these various additives to be included in compounds depends on the extent of modification desired, depending on the change in scope of physical or chemical property desired. It is possible to have such ingredients be present from about 0.1 weight percent to about 80 weight percent.

With these additives, the following engineered thermoplastic articles can be made.

Articles that can benefit from enhanced thermal conductivity include heat sinks such as for computer chip mounts, fuel cell radiators, aircraft leading edges, etc.

Articles that can benefit from enhanced electrical conductivity include bipolar plates for fuel cells, computer enclosures, electrodes, etc.

Articles that can benefit from enhanced sound dampening include automobile interiors, building interiors, etc.

Articles that can benefit from ionizing radiation opacity and/or atomic particle moderation include medical instruments, radioactive containers, radiation dosimeters, detection equipment, etc.

Other embodiments and advantages of the invention are found in the following examples.

EXAMPLES

Table 2 shows the ingredients of Examples 1-9, expressed in weight percent. Table 3 shows the processing conditions using a 16 mm Prism extruder. Table 3 also shows operator observations of strands of extruded polymer compound emerging from the extruder after cooling to ambient temperature.

TABLE 2

| Example Number | 1 | 2 | 3 | 4 | 5 | 6 | 7 | 8 | A |
|---|---|---|---|---|---|---|---|---|---|
| PHBV (Tianan Biologic Material Co., Ningbo, China) | 39 | 59 | 79 | 59.41 | 29 | 39 | 29 | 37.54 | 69 |
| MPO (Cyclics CBT 100) | | | | 20 | 19.8 | | | | |
| MPO* (Cyclics CBT 160) | 40 | 20 | | | | 20 | 20 | 20 | 19.2 | |
| PC (Dow Calibre 200) | | | | | | | | 50 | | 30 |
| PLA (NatureWorks) | | | | | 30 | 20 | | 19.2 | |
| Ethylene•Acrylate Copolymer Modifier (DuPont Elvaloy PTW) | 20 | 20 | | 19.8 | 20 | 20 | | 19.2 | |
| EEA Copolymer Modifier | | | | | | | | 3.9 | |
| BN₃ Nucleating Agent (General Electric PolarTherm PT 131) | 1 | 1 | 1 | 0.99 | 1 | 1 | 1 | 0.96 | 1 |
| Total | 100 | 100 | 100 | 100 | 100 | 100 | 100 | 100 | 100 |

*Functionalized cyclic-PBT believed to react with PHBV during extruder mixing

TABLE 3

| Extruder Conditions | 1 | 2 | 3 | 4 | 5 | 6 | 7 | 8 | A |
|---|---|---|---|---|---|---|---|---|---|
| Zone 1 (° C.) | 130 | 130 | 130 | 130 | 130 | 130 | 200 | 130 | 200 |
| Zone 2 (° C.) | 130 | 130 | 130 | 130 | 130 | 130 | 200 | 130 | 200 |
| Zone 3 (° C.) | 130 | 130 | 130 | 130 | 130 | 130 | 210 | 130 | 210 |
| Zone 4 (° C.) | 135 | 135 | 135 | 135 | 135 | 135 | 210 | 135 | 210 |
| Zone 5 (° C.) | 135 | 135 | 135 | 135 | 135 | 135 | 220 | 135 | 220 |
| Zone 6 (° C.) | 135 | 135 | 135 | 135 | 135 | 135 | 220 | 135 | 220 |
| Zone 7 (° C.) | 135 | 135 | 135 | 135 | 135 | 135 | 220 | 135 | 220 |
| Zone 8 (° C.) | 130 | 130 | 130 | 130 | 130 | 130 | 200 | 130 | 200 |
| Zone 9 (° C.) | 130 | 130 | 130 | 130 | 130 | 130 | 200 | 130 | 200 |
| Die (° C.) | 130 | 130 | 130 | 130 | 130 | 130 | 180 | 130 | 160 |
| RPM | 500 | 500 | 500 | 500 | 500 | 500 | 500 | 500 | 500 |
| % Torque | 77-80 | 77-80 | 77-81 | 75-80 | 75-80 | 79-80 | 65-71 | 79-80 | 38-40 |
| Feeder Rate | 70 | 70 | 70 | 65 | 35 | 35 | 40 | 35 | 40 |
| Vacuum | No | No | No | No | No | No | No | No | No |
| Observation | Ductile | Ductile | Ductile | Ductile | Ductile | Ductile | Ductile | Ductile | Brittle |

The invention is not limited to the above embodiments. The claims follow.

What is claimed is:

1. A thermoplastic compound, comprising:
   (a) polyhydroxyalkanoate
   (b) macrocyclic poly(alkylene dicarboxylate) oligomer
   wherein an extruded stand of the compound approximately 1-5 mm in diameter is capable of being bent to an angle of the ends being at least 90° relative to their original position without breaking.

2. The thermoplastic compound according to claim 1, wherein the macrocyclic poly(alkylene dicarboxylate) oligomer is cyclic polybutylene terephthalate or cyclic polyethylene terephthalate, and wherein an extruded stand of the compound approximately 1-5 mm in diameter is capable of being bent to an angle of the ends being at least 180° relative to their original position without breaking.

3. The thermoplastic compound according to claim 1, wherein the polyhydroxyalkanoate contains one or more monomeric units of the following formula:

$$-OCR^1R^2(CR^3R^4)_nCO-$$

wherein n is 0 or an integer; and

wherein $R^1$, $R^2$, $R^3$, and $R^4$ are independently selected from saturated and unsaturated hydrocarbon radicals, halo- and hydroxy-substituted radicals, hydroxy radicals, halogen radicals, nitrogen-substituted radicals, oxygen-substituted radicals, and hydrogen atoms.

4. The thermoplastic compound of claim 3, wherein the monomeric units comprise hydroxybutyrate, hydroxyvalerate, hydroxyhexanoate, hydroxyheptanoate, hydroxyoctanoate, hydroxynonanoate, hydroxydecanoate, hydroxyundecanoate, or hydroxydodecanoate.

5. The thermoplastic compound of claim 1, wherein the polyhydroxyalkanoate comprises polyhydroxybutyrate-co-valerate.

6. The thermoplastic compound of claim 1, wherein the polyhydroxyalkanoate is selected from the group consisting of polyhydroxybutyrate-co-hydroxyvalerate, polyhydroxybutyrate-co-4-hydroxybutrate, polyhydroxybutyrate-co-3-hydroxyhexanoate, polyhydroxybutyrate-co-3-hydroxyheptanoate, and polyhydroxybutyrate-co-3-hydroxyoctanoate.

7. The thermoplastic compound of claim 1, further comprising a nucleating agent.

8. The thermoplastic compound of claim 1, further comprising an additional polymer selected from the group consisting of polycarbonate, polylactic acid, linear low density polyethylene, ethylene ethyl acrylate copolymer, and combinations thereof.

9. The thermoplastic compound of claim 1, further comprising adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

10. The thermoplastic compound according to claim 1, further comprising an effective amount of a property-modifying additive selected from the group consisting of a thermal conductivity additive, an electrical conductivity additive, a sound dampening additive, an ionizing-radiation-opacity additive, an atomic-particle-moderating additive, and combinations thereof.

11. The thermoplastic compound of claim 10, wherein the property-modifying additive is a thermal conductivity additive selected from the group consisting of pitch carbon, graphite, diamond, metal nitrides such as boron nitride and aluminum nitride, nanotubes of carbon and boron nitride, titanium diboride, cobalt, zinc, molybdenum, iridium, silicon, rhodium, magnesium, tungsten, berylium, aluminum, gold, copper, silver, and combinations thereof.

12. The thermoplastic compound of claim 10, wherein the property-modifying additive is an electrical conductivity additive selected from the group consisting of carbon black, silver, copper, stainless steel powder or fibers, graphite, zinc, aluminum, carbon nanotubes, manganese, bismuth, samarium, titanium, zirconium, lead, antimony, vanadium, chromium, tin, palladium, platinum, iron, nickel, zinc, cobalt, molybdenum, tungsten, iridium, indium, rhodium, magnesium, berylium, aluminum, gold, silver, magnetite, bronze, brass, and combinations thereof.

13. The thermoplastic compound of claim 10, wherein the property-modifying additive is a sound dampening additive selected from the group consisting of tungsten, barium sulfate, zirconium sulfate, calcium sulfate, lead, tungsten, gold, platinum, iridium, osmium, rhenium, tantalum, hafnium, palladium, rhodium, borite, magnetite, hematite, zirconia, ceramic beads, chromite, and combinations thereof.

14. The thermoplastic compound of claim 10, wherein the property-modifying additive is an ionizing-radiation-opacity additive selected from the group consisting of tungsten, lead, zirconium, graphite, silicon, indium, aluminum, iridium, boron, cadmium, europium, samarium, and combinations thereof.

15. The thermoplastic compound of claim 10, wherein the property-modifying additive is an atomic-particle-moderating additive selected from the group consisting of tungsten, lead, zirconium, graphite, silicon, indium, aluminum, iridium, boron, cadmium, europium, samarium, and combinations thereof.

16. An article made from the thermoplastic compound of claim 1.

17. The article of claim 16, wherein the article is in the form of computer chip mounts, fuel cell radiators, aircraft leading edges, bipolar plates for fuel cells, computer enclosures, electrodes, automobile interiors, building interiors, medical instruments, radioactive containers, radiation dosimeters, and detection equipment.

18. The article of claim 16,
wherein the macrocyclic poly(alkylene dicarboxylate) oligomer is cyclic polybutylene terephthalate or cyclic polyethylene terephthalate,
wherein the polyhydroxyalkanoate is selected from the group consisting of polyhydroxybutyrate-co-valerate, polyhydroxybutyrate-co-hydroxyvalerate, polyhydroxybutyrate-co-4-hydroxybutyrate, polyhydroxybutyrate-co-3-hydroxyhexanoate, polyhydroxybutyrate-co-3-hydroxyheptanoate, and polyhydroxybutyrate-co-3-hydroxyoctanoate, and
wherein the compound further comprises a nucleating agent and an additional polymer selected from the group consisting of polycarbonate, polyactic acid, linear low density polyethylene, ethylene ethyl acrylate copolymer, and combinations thereof.

19. The article of claim 16,
wherein the compound further comprises adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

20. The article of claim 16,
wherein the thermoplastic compound further comprises an effective amount of a property-modifying additive, an electrical conductivity additive, a sound dampening additive, an ionizing-radiation-opacity additive, an atomic-particle-moderating additive, and combinations thereof.

* * * * *